(12) United States Patent
Horton et al.

(10) Patent No.: US 7,222,723 B2
(45) Date of Patent: May 29, 2007

(54) APPARATUS FOR DIVERTING A STREAM OF ARTICLES

(75) Inventors: Paul L Horton, Metairie, LA (US); David W Bogle, Destrehan, LA (US); John C Hawkins, Jr., Mandeville, LA (US); Joseph M DePaso, Gretna, LA (US)

(73) Assignee: Hartness International, Inc., Greenville, SC (US)

( * ) Notice: Subject to any disclaimer, the term of this patent is extended or adjusted under 35 U.S.C. 154(b) by 0 days.

(21) Appl. No.: 11/246,572

(22) Filed: Oct. 7, 2005

(65) Prior Publication Data

US 2006/0027439 A1 Feb. 9, 2006

Related U.S. Application Data

(63) Continuation of application No. 10/461,210, filed on Jun. 13, 2003, now Pat. No. 7,021,452, which is a continuation of application No. 10/317,952, filed on Dec. 12, 2002, now Pat. No. 6,585,104, which is a continuation of application No. 09/803,564, filed on Mar. 9, 2001, now Pat. No. 6,497,321.

(51) Int. Cl.
*B65G 47/51* (2006.01)

(52) U.S. Cl. .................................. 198/594

(58) Field of Classification Search ............. 198/594, 198/444
See application file for complete search history.

(56) References Cited

U.S. PATENT DOCUMENTS

| 4,063,632 A | 12/1977 | Neth et al. |
| 4,364,465 A | 12/1982 | Kraft et al. |
| 4,401,020 A | 8/1983 | Brux |
| 4,413,724 A | 11/1983 | Fellner |

(Continued)

FOREIGN PATENT DOCUMENTS

| CA | 2 364 216 A1 | 3/2006 |
| DE | 1 262 886 | 3/1968 |
| DE | 26 18 905 A1 | 11/1977 |
| DE | 1 985 664 9 A1 | 6/2000 |
| FR | 2 583 394 A1 | 6/1985 |
| JP | S59-53315 | 3/1984 |
| JP | H5 262423 | 10/1993 |
| JP | H5 286552 | 11/1993 |

*Primary Examiner*—Douglas Hess
(74) *Attorney, Agent, or Firm*—Dority & Manning, P.A.

(57) ABSTRACT

Apparatus is disclosed for diverting a stream of articles, the apparatus including a framework, a first conveyor supported in the framework and conveying stream of articles along a first conveying surface, and a second conveyor supported in the framework parallel to the first conveyor and having a second conveying surface. A first drive mechanism drives the first conveyor at a first speed in a first direction, and a second drive mechanism drives the second conveyor at a second speed in a second direction opposite to the first direction. A carrier is arranged to travel along a path parallel to the first and second conveyors, and a diverter element is affixed to the carrier and extending across at least a portion of the conveying surfaces of the first and second conveyors to divert articles in the stream on the first conveyor to the second conveyor. A carrier drive mechanism is operatively configured to drive the carrier along the path at a speed and in a direction that depends on the first speed and the second speed. The carrier drive mechanism is disposed in a stationary position with reference to the framework. A controller calculates a differential speed corresponding to the difference in first and second speeds of the first and second conveyors respectively, and for controlling the carrier drive mechanism for driving the carrier at the differential speed.

18 Claims, 8 Drawing Sheets

U.S. PATENT DOCUMENTS

| | | | |
|---|---|---|---|
| 4,469,219 A | 9/1984 | Cosse | |
| 4,513,858 A | 4/1985 | Fellner et al. | |
| 4,549,647 A | 10/1985 | Cosse | |
| 5,067,857 A | 11/1991 | Ward | |
| 5,267,821 A | 12/1993 | Bodart et al. | |
| 5,277,294 A | 1/1994 | Sherepa et al. | |
| 5,282,525 A | 2/1994 | Covert | |
| 5,350,050 A | 9/1994 | Franke | |
| 5,413,213 A | 5/1995 | Golz et al. | |
| 5,490,589 A | 2/1996 | Golz et al. | |
| 5,690,463 A | 11/1997 | Yoshie | |
| 5,772,005 A | 6/1998 | Hansch | |
| 6,026,947 A | 2/2000 | Persson | |
| 6,152,291 A | 11/2000 | Steeber et al. | |
| 6,168,005 B1 | 1/2001 | Petrovic | |
| 6,182,812 B1 | 2/2001 | Hartness, III et al. | |
| 6,260,688 B1 | 7/2001 | Steeber et al. | |
| 6,382,398 B2 | 5/2002 | Steeber et al. | |
| 6,497,321 B2 | 12/2002 | Horton et al. | |
| 6,533,103 B2 | 3/2003 | Hartness et al. | |
| 6,585,104 B2 | 7/2003 | Horton et al. | |
| 6,591,963 B2 | 7/2003 | Wipf | |
| 6,612,420 B1 | 9/2003 | Hartness, III et al. | |
| 6,848,563 B2 | 2/2005 | Abert et al. | |
| 7,021,452 B2 * | 4/2006 | Horton et al. | 198/594 |
| 7,028,830 B2 * | 4/2006 | Beesley et al. | 198/594 |
| 7,032,742 B2 * | 4/2006 | Hartness et al. | 198/594 |

* cited by examiner

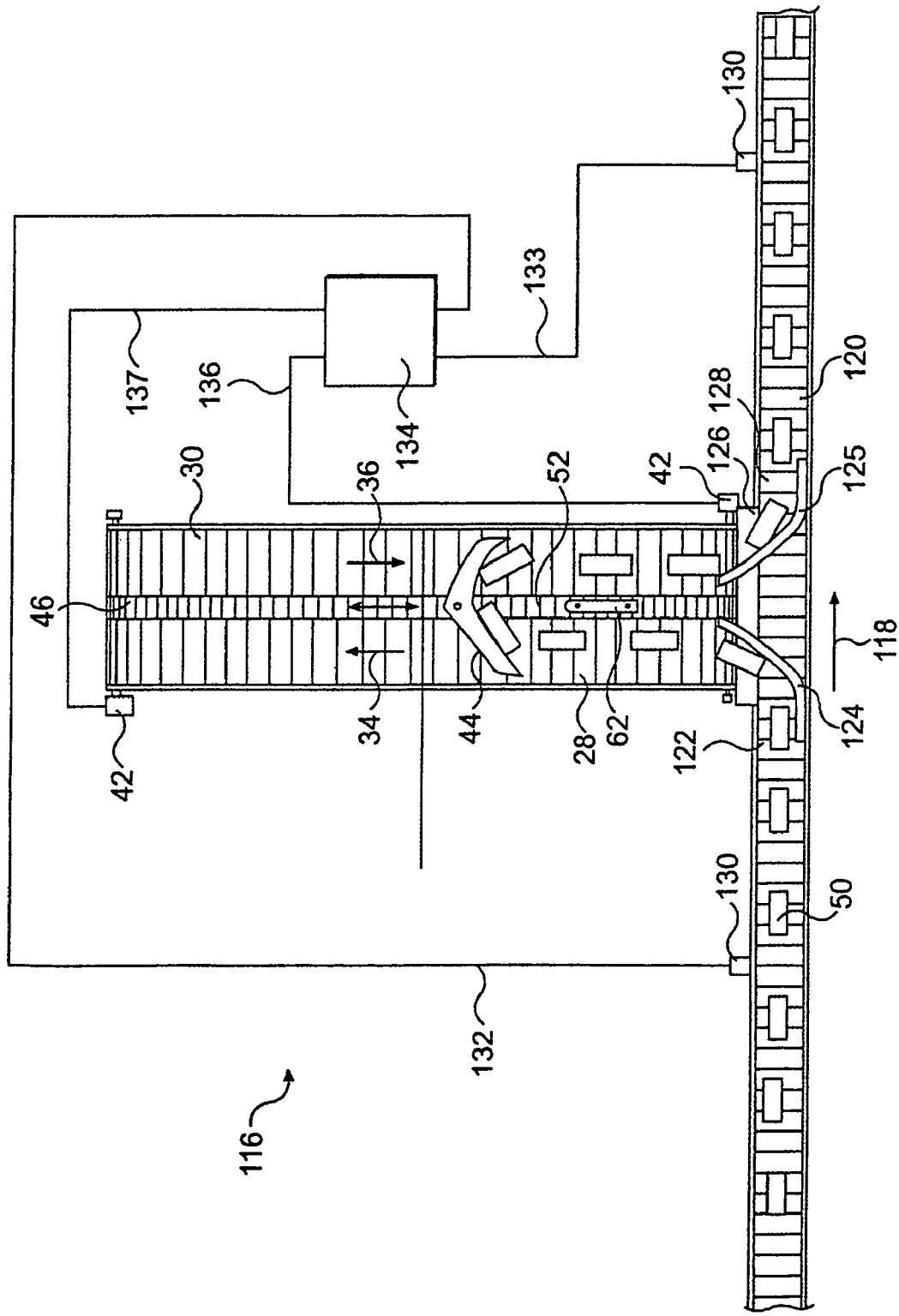

APPARATUS FOR DIVERTING A STREAM OF ARTICLES

RELATED APPLICATIONS

The present application is a Continuation Application of U.S. application Ser. No. 10/461,210, filed Jun. 13, 2003 now U.S. Pat. No. 7,021,452, which is a Continuation Application of U.S. application Ser. No. 10/317,952 filed Dec. 12, 2002, and now granted as U.S. Pat. No. 6,585,104, which is a Continuation Application of U.S. application Ser. No. 09/803,564, filed Mar. 9, 2001, and now granted as U.S. Pat. No. 6,497,321, all of which are incorporated by reference herein, and to which benefit is claimed under 35 U.S.C. § 120.

FIELD OF THE INVENTION

This invention relates generally to conveying systems having plural power-driven conveying sections and, more particularly, to apparatus for varying the effective length of the system by controlling the diversion of conveyed articles from one conveyor section to another.

BACKGROUND OF THE INVENTION

Many conveyor applications require that articles transported on one conveyor belt be transferred to another conveyor belt that may be traveling in another direction, such as the opposite direction. Stationary rails spanning the conveying surfaces of the belts at a transfer point are often used for this purpose. In some applications, such as article accumulation, the transfer point can be moved. The moving transfer point allows the effective length of the conveying path and, consequently, the amount of articles accumulated to be controlled. In a spiral accumulator, such as that shown in U.S. Pat. No. 6,152,291, two parallel conveyor belts—an infeed belt and outfeed belt—are helically arranged with a rotatable transfer mechanism traveling between them. The position of the transfer mechanism depends on the relative speeds of the two oppositely-moving belts. A guide plate on the transfer mechanism directs articles from the infeed conveyor belt to the outfeed belt. A rotatable member in the transfer mechanism simultaneously engages drivers formed on the specially designed infeed and outfeed belts. The rotatable member, driven by the drivers, translates the transfer mechanism and its attached guide plate along the belts as determined by their relative speeds. The rotatable member rides along with the transfer mechanism.

A more common accumulation system is known as a bi-di (bi-directional) table. Typically, a bi-di table includes a bi-directional conveyor belt arranged to run perpendicular to a main conveyor belt. As articles build up on the main conveyor belt, backpressure directs them onto the bi-di belt, which runs in a direction away from the main conveyor. In this way, articles are accumulated on the bi-di belt's surface. As downstream processes require more articles, the direction of the bi-di belt is reversed so that the accumulated articles are pushed back onto the main conveyor belt. These bi-di tables, which support the bi-di belt and its drive mechanisms, are generally rectangular in shape with drive or idler shafts for sprockets or pulleys at each end. But, unlike the spiral accumulator, these simple, ubiquitous tables are not first-in, first out.

Thus, there is a particular need for a simple first in, first-out accumulation system, especially one that can be easily retrofitted in a bi-di table. More generally, there is also a need for a simple mechanism for diverting articles from one conveyor belt to another, such as oppositely-moving conveyor belts.

SUMMARY OF THE INVENTION

These needs and others are satisfied by a novel article-diverting apparatus embodying features of the invention. In the apparatus, a first conveyor belt is driven in a first direction at a first speed. A second conveyor belt is driven at a second speed in a different second direction, typically the opposite direction. A stream of articles is conveyed along a conveying surface of the first conveyor. A carrier travels along a path generally parallel to the first and second conveyor belts. A diverter element affixed to the carrier extends across at least a portion of the conveying surfaces of the first and second belts to divert articles in the stream from the first belt to the second belt. The carrier is controlled by a differential drive mechanism at a speed that depends on the speeds of the first and second conveyor belts. In this way, the position of the diverter element and, hence, the transfer point are determined by the relative speeds of the two belts.

In one version of the apparatus, the differential drive mechanism is stationarily attached to a framework supporting the carrier and the first and second belts. In another version, the differential drive mechanism is attached, not directly to the first and second belts, but to a first drive mechanism driving the first belt and to a second drive mechanism driving the second belt. This permits non-custom, less-expensive, standard belts to be used as the first and second belts.

In a first-in, first-out accumulator using the apparatus of the invention, a stream of articles at an upstream position on a main conveyor is supplied to the first, or infeed, conveyor belt, transferred to the second, or outfeed, conveyor belt by the diverter element on a carrier, and then fed by the second belt back to the main conveyor line at a downstream location. The amount of accumulation is determined by the carrier drive mechanism, which positions the carrier and diverter element along the infeed and outfeed belts depending on their relative speeds.

In other versions, the carrier is an endless carrier belt parallel to the first and second belts. The belt can be an intermediate belt between and abutting the first and second belts with a transfer surface portion across which products are transferred from the first belt to the second belt. Alternatively, the carrier belt flanks the first conveyor belt and carries the affixed diverter element. The flanking belt can be used in conjunction with another flanking belt on the opposite side of the second conveyor that provides two-sided support for the diverter element. In this version, the first and second conveyor belts can be abutted for direct transfer of articles from one to the other. In one version in which a carrier belt is used, the first and second belts engage rotating elements including aligned shafts with sprockets about which the belts articulate. The differential drive mechanism is rotationally coupled to the rotating assemblies and engages the carrier belt to drive at a speed that depends on the relative speeds of the conveyor belts. This version is especially easy to retrofit in an existing bi-di table to achieve first-in, first-out capability.

In one version, the differential drive mechanism is differentially geared to the first and second drive mechanisms. But the belts and carrier can alternatively be controlled by a controller that individually controls the drive mechanisms of the first and second conveyor belts and the carrier. In either of these examples, the drive characteristics can be tailored for various applications by setting the speed of the carrier to be $as_1 - bs_2$, where $s_1$ is the speed of the first conveyor belt, $s_2$ is the speed of the second conveyor belt, and a and b are adjustable parameters that are chosen to fit the application.

Thus, the apparatus provides clear advantages in diverting articles from one conveyor belt to a parallel, oppositely moving conveyor belt.

According to certain other aspects of the invention, an apparatus is disclosed for diverting a stream of articles, the apparatus including a framework, a first conveyor supported in the framework and conveying stream of articles along a first conveying surface, and a second conveyor supported in the framework parallel to the first conveyor and having a second conveying surface. A first drive mechanism drives the first conveyor at a first speed in a first direction, and a second drive mechanism drives the second conveyor at a second speed in a second direction opposite to the first direction. A carrier is arranged to travel along a path parallel to the first and second conveyors, and a diverter element is affixed to the carrier and extending across at least a portion of the conveying surfaces of the first and second conveyors to divert articles in the stream on the first conveyor to the second conveyor. A carrier drive mechanism is operatively configured to drive the carrier along the path at a speed and in a direction that depends on the first speed and the second speed. The carrier drive mechanism is disposed in a stationary position with reference to the framework. A controller calculates a differential speed corresponding to the difference in first and second speeds of the first and second conveyors respectively, and for controlling the carrier drive mechanism for driving the carrier at the differential speed. Various options and modifications are possible.

BRIEF DESCRIPTION OF THE DRAWINGS

These and other features, aspects, and advantages of the inventions are further addressed in the following description, appended claims, and accompanying drawings, in which:

FIG. 11 is a top plan schematic of a first-in, first-out accumulator application using the apparatus of FIG. 1.

DETAILED DESCRIPTION

Figure 1:
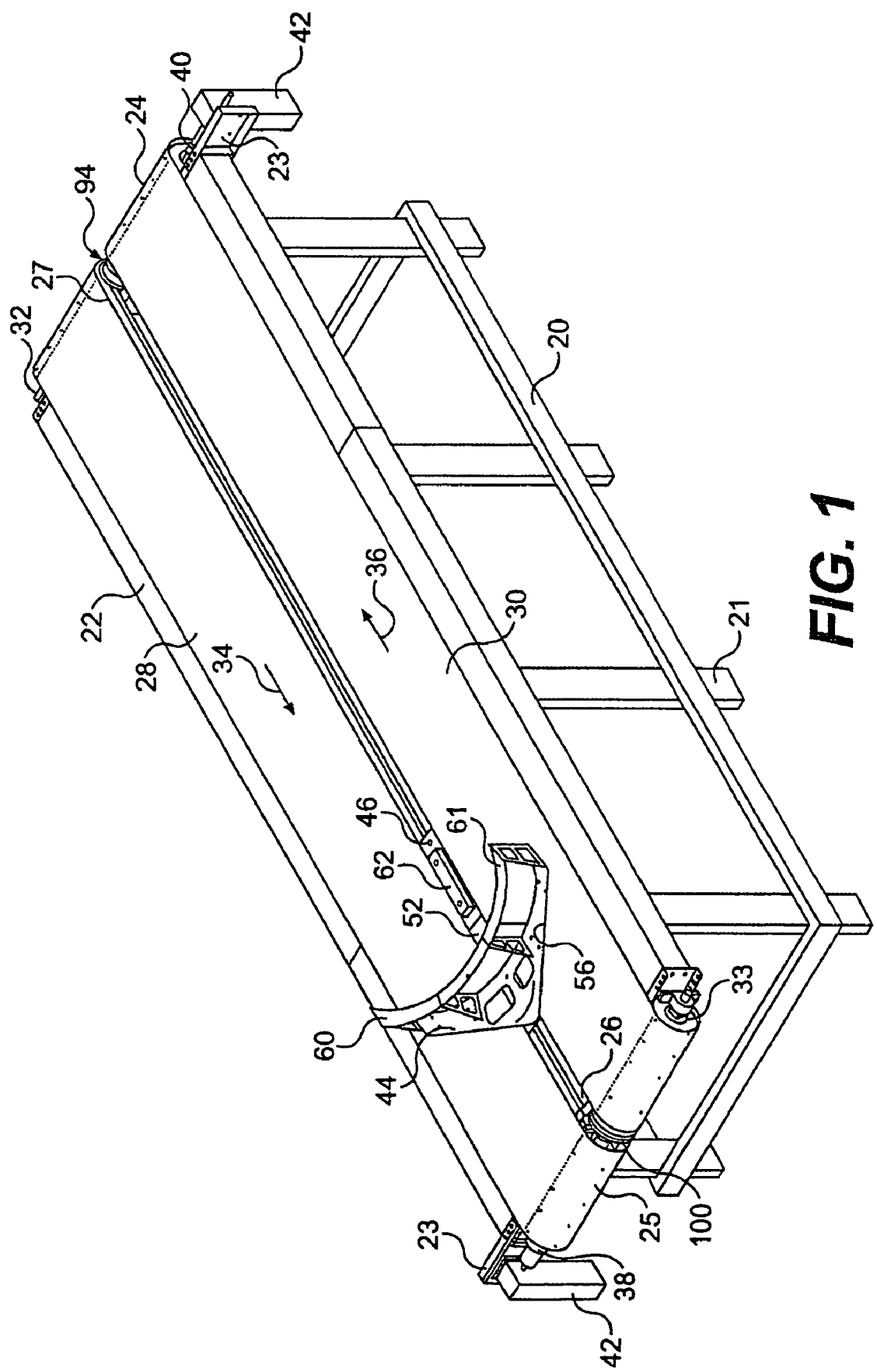
FIG. 1 is an isometric view, partly cut away, of an apparatus embodying features of the invention, the apparatus including a diverter element for diverting a stream of articles.
Figure 2:
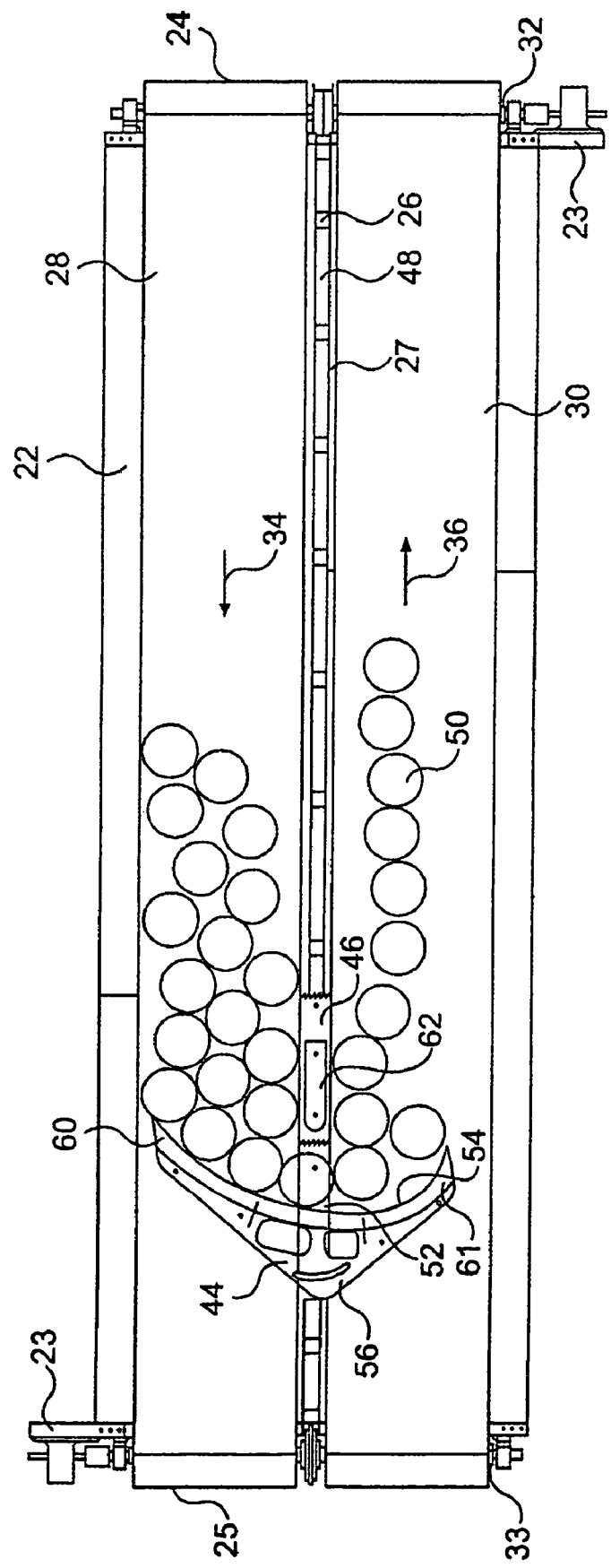
FIG. 2 is a top plan view of the apparatus of FIG. 1.

An apparatus embodying features of the invention for diverting articles from a stream of articles is shown in FIGS. 1 and 2. The apparatus includes a conveyor bed formed by a framework 20 with legs 21 and a pair of parallel upper support rails 22. Crossbeams 23 span the support rails at opposite ends 24, 25 of the conveyor bed. Cross supports 26 forming part of the framework support a conveyor pan or wearstrips 27 that underlie the carryway of a first infeed conveyor 28 and a parallel second outfeed conveyor 30.

Each conveyor includes an endless belt, or chain, wrapped around rotating assemblies 32, 33 at the first and second ends 24, 25 of the conveyor bed. The belt, or chain, is preferably an endless modular plastic conveyor belt, such as any of those standard belts manufactured and sold by Intralox, Inc. of Harahan, La., USA. Modular conveyor belts are preferable because the modules can be easily linked together end to end and side by side with hinge pins typically in a bricklay pattern to construct belts of almost any length and width. But any belt, including, for example, metal chains or fabric belts, could be used effectively. The infeed belt 28 and the outfeed belt 30 are driven in the direction of arrows 34, 36.

In the example of FIGS. 1 and 2, the infeed belt 28 is driven by a first infeed drive mechanism 38, which is part of the second rotating assemblies 33. The outfeed belt 30 is driven by a second outfeed drive mechanism 40, which is part of the first rotating assemblies 32. In this drive arrangement, the first and second drive mechanisms pull the belts in tension along the conveyor carryway in the direction of the arrows 34, 36. Motors 42, preferably variable-speed motors, in the infeed and outfeed drive mechanisms rotate the rotating assemblies, which engage the belts positively or frictionally, to drive the belts in the directions shown.

The apparatus also includes a diverter element 44 that extends across at least a portion of the width of the first and second conveyors. The diverter element is attached to a carrier, in this example, an intermediate belt 46 disposed in the space 48 between the infeed and outfeed belts. The intermediate belt is preferably a modular plastic conveyor belt, but could as well be a metal chain or a fabric belt. Only a portion of the intermediate belt is shown in FIGS. 1 and 2 in order to show other features of the apparatus, but the intermediate belt is co-extensive with the infeed and outfeed belts in that it is also an endless belt wrapped around the first and second rotating assemblies 32, 33. The intermediate belt, positioned between the infeed and outfeed belts, abuts each of them with only a minimal gap. (Siderails to confine articles on the conveyor are not shown to simplify illustration.)

Figure 3:
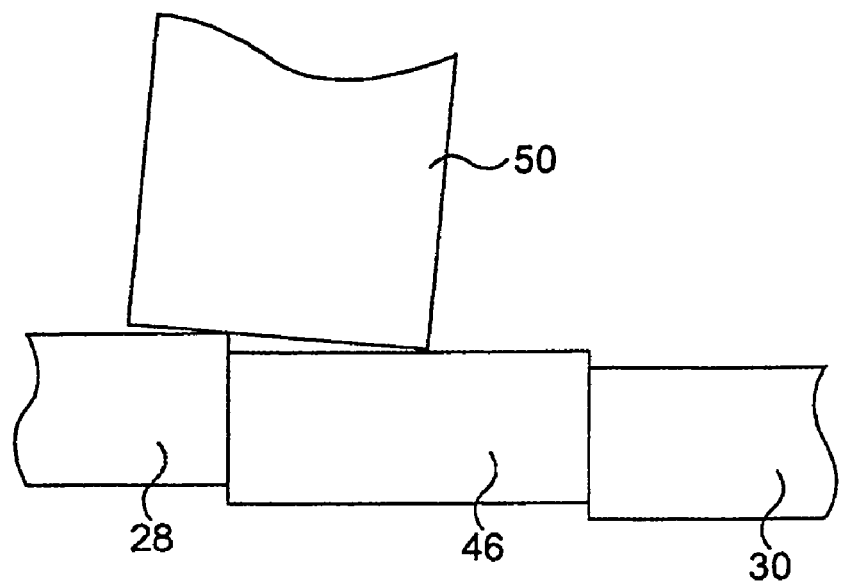
FIG. 3 is an end elevation schematic of a stepped arrangement of conveying surfaces usable in the apparatus of FIG. 1.

The diverter element 44 captures articles 50 from a stream of articles on the infeed belt 28 and directs them across a transfer surface 52 of the intermediate belt onto the outfeed belt 30 traveling in the opposite direction. The diverter element has a guide surface 54, in this example, an arcuate surface, upstanding from a base 56. The base is attached to a section of the intermediate belt so that the diverter element moves with the intermediate belt. Arms 60, 61 of the diverter element extend across at least a portion of the conveying surfaces of the infeed and outfeed belts. In the version shown in FIGS. 1 and 2, the first arm 60 extends across most of the width of the infeed belt. In this case, all of the articles 50 in the stream are received by the diverter element. But it is also possible to have a shorter first arm that would capture some articles, but allow others to pass. The arms can ride directly on the infeed and outfeed conveyors, or they can be positioned above the conveying surfaces as long as they are not so high as to allow articles to be diverted to pass underneath in normal operation. A barrier 62 is also attached to the intermediate belt. The guide surface of the diverter element and the barrier bound the transfer surface 52 of the intermediate belt. The barrier ensures that products are diverted only across the transfer surface and not at other points along the carryway. For smooth transfer of product, the conveying surfaces of the infeed and outfeed belts are preferably coplanar with the outer surface of the intermediate belt. It would also be possible, as shown in FIG. 3, to have the conveying surfaces of the infeed 28 and outfeed 30 conveyor belts and the outer surface of the intermediate belt 46 stepped down in elevation from the infeed belt to the outfeed belt. Alternatively, the entire conveyor bed could be slanted downward, off horizontal, toward the outfeed belt to get an assist from gravity in clearing articles off the transfer surface.

Figure 4:
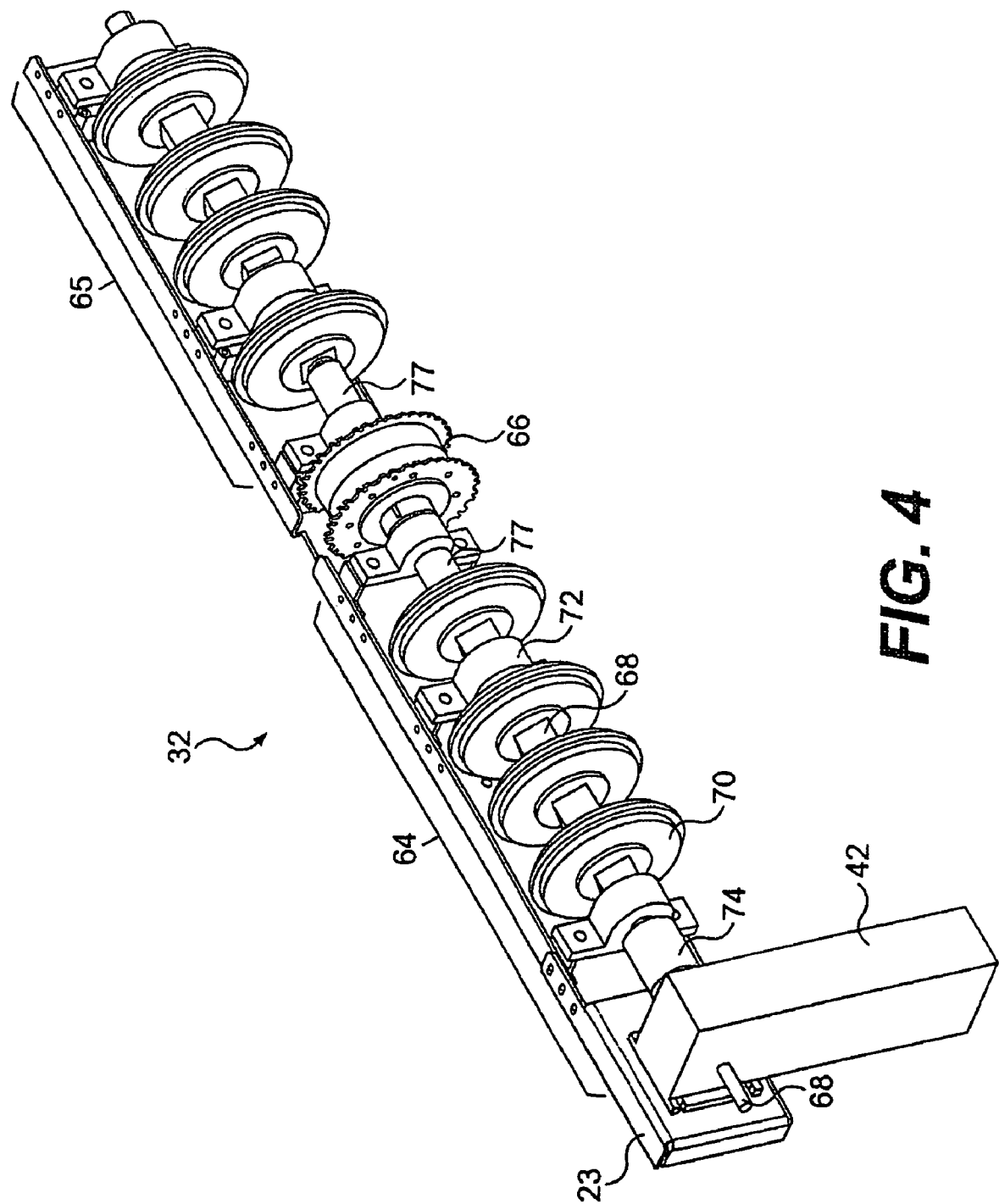
FIG. 4 is an isometric view of a drive mechanism, including a differential drive, at one end of the apparatus of FIG. 1.

In the exemplary version of the apparatus shown in FIGS. 1 and 2, the rotating assemblies 32 at the first end 24 of the conveyor bed are shown in more detail in FIG. 4. A first rotating assembly 64 and a second rotating assembly 65 are coaxially arranged and terminate in a differential drive mechanism 66. The first rotating assembly actively drives the outfeed belt 30. The assembly is stationarily mounted to the crossbeam 23. The assembly includes the drive motor 42, which, in this example, has a right-angle drive shaft 68. The first rotating assembly includes a shaft 69, which is shown segmented, on which sprockets 70 are mounted. Bearing blocks 72 support the shafts for rotation. The numbers of bearing blocks, sprockets, and shaft segments required depend on the width of the belt and its load. In this example, four sprockets, three bearing blocks, and two shaft segments are shown for the first rotating assembly. The sprocket shaft 69 is connected to the motor drive shaft 68 by a coupling 74. The other end of the sprocket shaft is connected to a differential shaft 76 (FIG. 5) by a coupling 77. The sprockets have peripheral teeth (shown in FIG. 4 as a raised portion to simplify the drawing) that engage underside receiving structure in the outfeed belt, or chain, to drive and track it. In the case of a fabric belt, the toothed sprockets are replaced by roller pulleys that frictionally drive the belt.

While the first rotating assembly 64 at the first end of the belt forms a drive mechanism for the outfeed belt, the second rotating assembly 65 is an idler assembly for the infeed belt 28. In this version of the apparatus, the drive mechanism for the infeed conveyor is in the rotating assemblies 33 stationed at the other end 25 of the conveyor bed. Although this arrangement is preferable because both drive mechanisms are pulling the belts, the drives could be stationed at the same end or, especially for long belts, distributed along the length of the belts. The idler assembly 65 is similar to the first rotating assembly 64, but is not directly coupled to a motor. It is, however, coupled to the differential drive mechanism by a coupling 77. Thus, the differential drive mechanism is coupled to each rotating assembly, which rotates at a speed corresponding to the speed of the associated belt. Each rotating assembly, whether including a drive shaft or an idler shaft, acts as an input drive mechanism to the differential drive mechanism.

Figure 5:
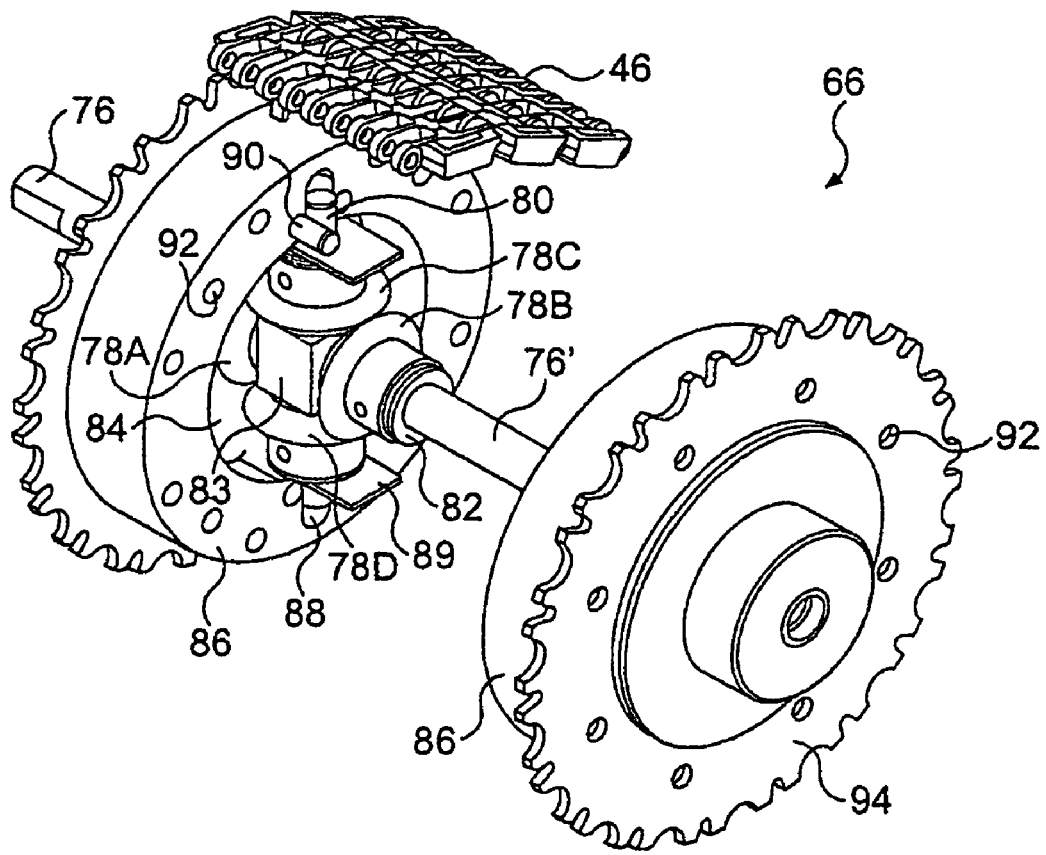
FIG. 5 is an isometric view of the opened-up differential drive mechanism of FIG. 4.

The differential drive mechanism is shown in more detail in FIG. 5. The mechanism includes four bevel gears 78A–D. The differential shaft 76, rotating at the speed of the outfeed belt, is connected to the bevel gear 78A. The differential shaft 76', rotating at the speed of the infeed belt, is connected to the opposite bevel gear 78B. The gears mesh with gears 78C and 78D, which are coaxially and rotatably aligned as pinion gears on pinion shaft 80. Couplings 82 retain the bevel gears in place on the shafts and pinion shaft. The ends of the pinion shaft extend from a spider 83, which also provides supports for the differential shafts 76, 76'. The differential mechanism fits in a hollow 84 formed in the center of two mating central housing halves 86. The ends of the pinion shaft fit in cavities 88 formed radially in the housing halves. Metal plates 89 serve as thrust bearings. Dowels 90 register the two housing halves, which are held together conventionally by bolts or screws through holes 92. A toothed sprocket wheel 94 is attached to each housing half. The peripheral teeth of the sprocket wheel engage the intermediate belt 46 to drive it.

The geared differential works conventionally in that relative motion of the shaft output bevel gears 78A and 78B causes the pinion gears 78C and 78D to rotate about the axis of the differential shafts 76, 76'. As the pinion gears rotate, the ends of the pinion shaft 80 cause the housing and the sprocket wheels to rotate. The speed of rotation depends on the relative speeds of the rotation of the output shaft bevel gears. In the situation where the outfeed belt and the infeed belt are moving at the same speed in opposite directions, the outfeed output bevel gear 76 rotates in one direction at a certain speed and the infeed output bevel gear 76' rotates in the opposite direction at the same speed, which causes the pinion gear assembly to rest with its pinion shaft stationary. As one of the conveyor belts speeds up relative to the other, the differential drive mechanism causes the housing and sprocket wheel assembly to rotate in the direction of the faster moving rotating assembly, but at half the difference between the speeds of each rotating assembly. Thus, in this example, the speed s of the intermediate belt is given by $s=\frac{1}{2}(s_1-s_2)$, where $s_1$ is the speed of the faster-moving belt and $s_2$ is the speed of the slower-moving belt. Of course, the gearing ratios can be altered by the use of gear reducers or other conventional techniques to derive other speed relationships that may be generically defined by s is proportional to $as_1-bs_2$, where a and b are parameters set by the effective gear ratios, for example. This would allow the intermediate belt to be driven at a speed that is influenced relatively more by one of the conveyor belts than the other in special applications.

Figure 6:
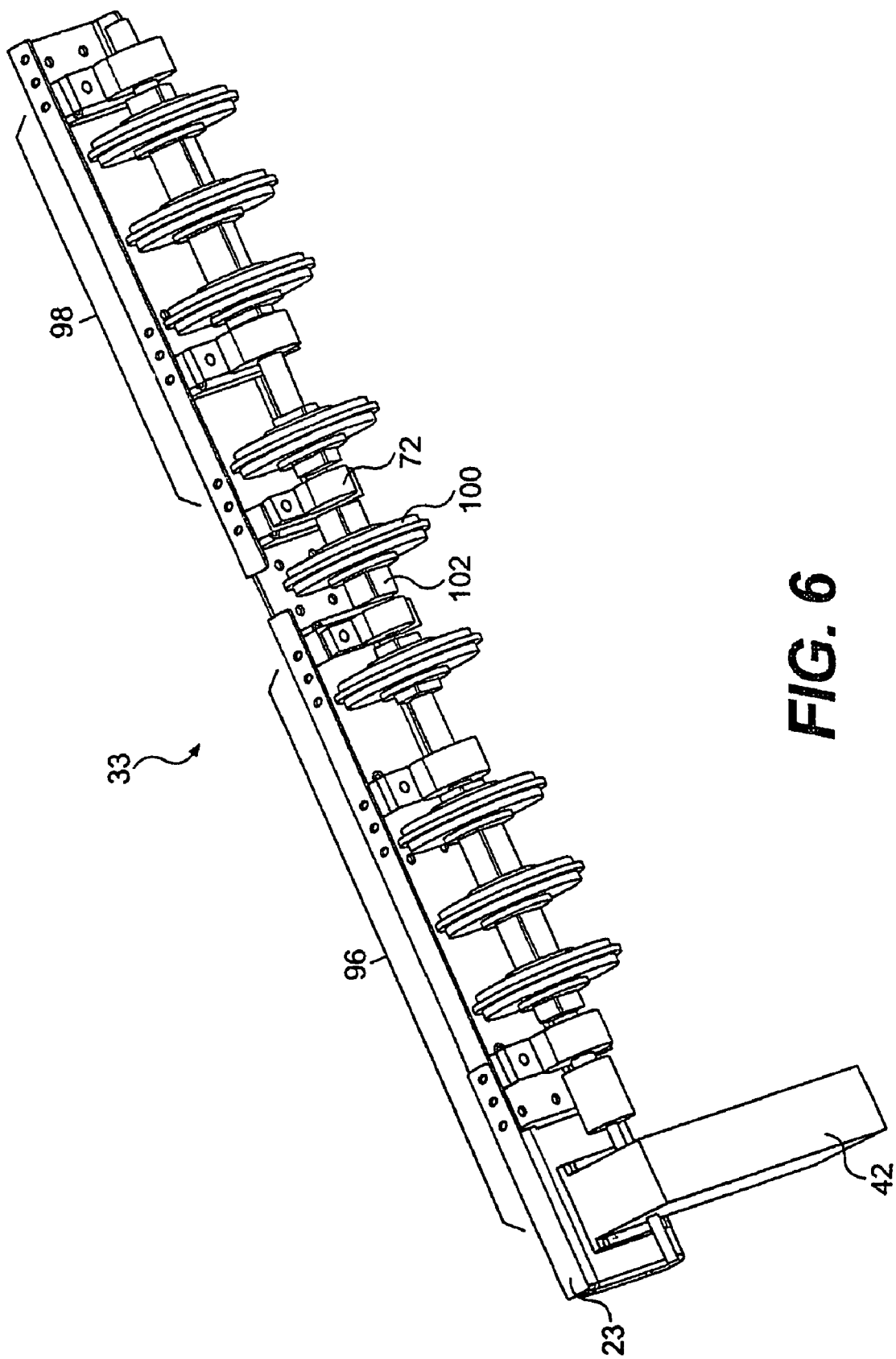
FIG. 6 is an isometric view of a drive mechanism at the opposite end of FIG. 1 from the drive mechanism in FIG. 4.

The second rotating assemblies 33 stationed at the second end 25 of the conveyor bed are similar to those at the first with the following difference shown in FIG. 6. First, the drive motor 42 for the infeed belt and its drive elements 96 are mounted on the crossbeam 23 at this end. Second, idler elements 98 form the rotating assembly for the infeed belt. Third, the rotating elements, although mounted coaxially, do not drive a differential mechanism at this end. Instead, an idler sprocket 100 on an idler shaft 102 supported by flanking bearing blocks 72 is provided to support and track the endless intermediate belt 46 at this end of the conveyor bed.

Figure 7:
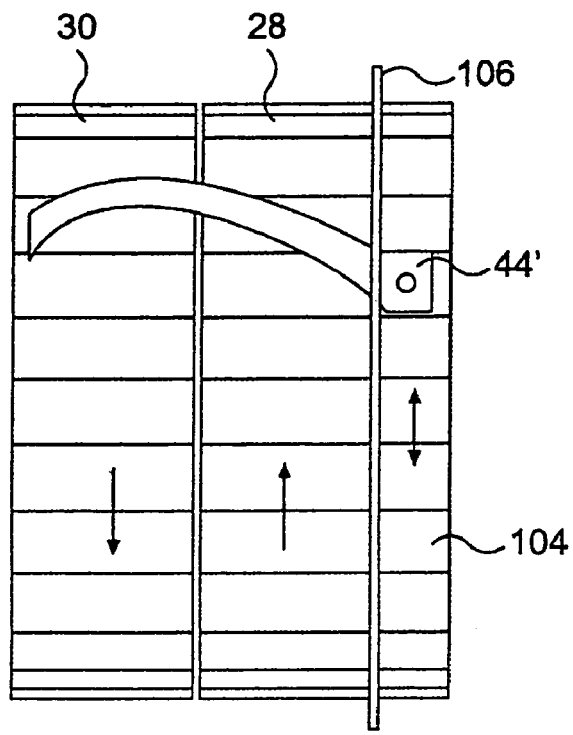
FIG. 7 is a top plan view of another version of apparatus for diverting articles, in which the diverter element is driven from one side.

Another version of an apparatus for diverting articles is shown in FIG. 7. In this version, the infeed belt 28 and the outfeed belt 30 abut each other. The diverter element 44' is carried by a carrier belt 104 next to, in this example, the infeed belt. The diverter element extends through a gap between stationary side rails 106 across the conveying surfaces of the infeed and outfeed conveyor belts to direct articles from the first belt directly to the oppositely running second belt without having to traverse an intermediate belt—a distinct advantage. The carrier belt is driven differentially by the drive mechanisms of each of the conveyor belts. Because, in this version, the carrier belt is not adjacent to the outfeed belt, the drive mechanism of the outfeed belt would have to be connected with the differential drive mechanism of the carrier belt through an intervening jackshaft or some other conventional linkage.

Figure 8:
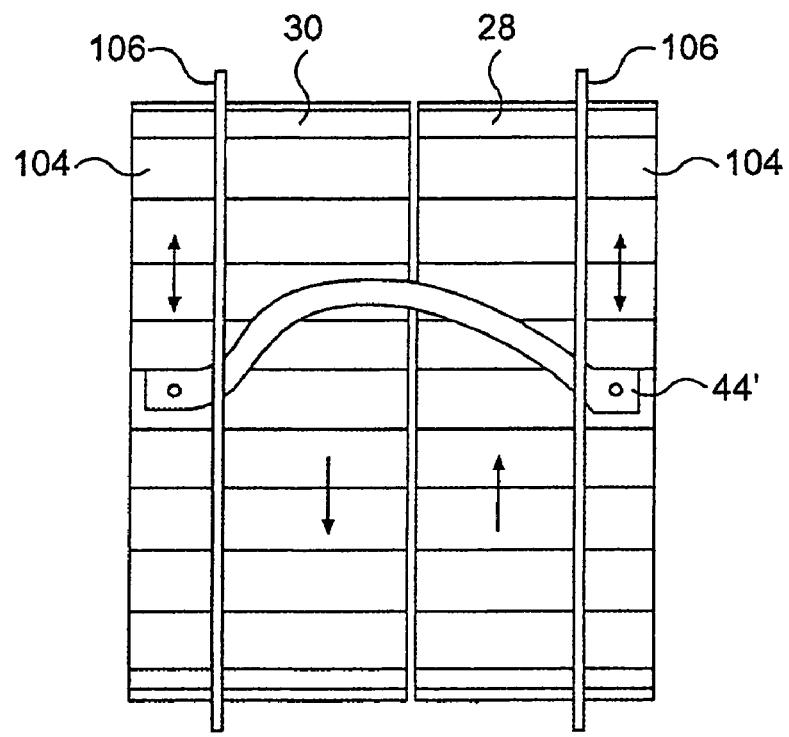
FIG. 8 is a top plan view of another variation of diverter apparatus as in FIG. 7 with the diverter attached at flanking positions.

A slightly modified alternative to the apparatus in FIG. 7 is illustrated in FIG. 8. In this version, a diverter element 44" is carried at each end by a carrier belt 104. This version provides better support for the diverter element. The two flanking carrier belts are each driven differentially in unison.

The versions described thus far are especially adaptable to be retrofitted into existing bi-di tables, which typically provide for sprockets, shafts, and motors at each end and include belt-supporting structure along the carryway and returnway. Essentially, the bi-di belt and its drive and idler sprocket assemblies are replaced by the belts and rotating assemblies of the invention. The remainder of the bi-di conveyor bed remains largely unchanged. As already mentioned, the versions described lend themselves to easy expansion through widening or lengthening of the belts.

Figure 9:
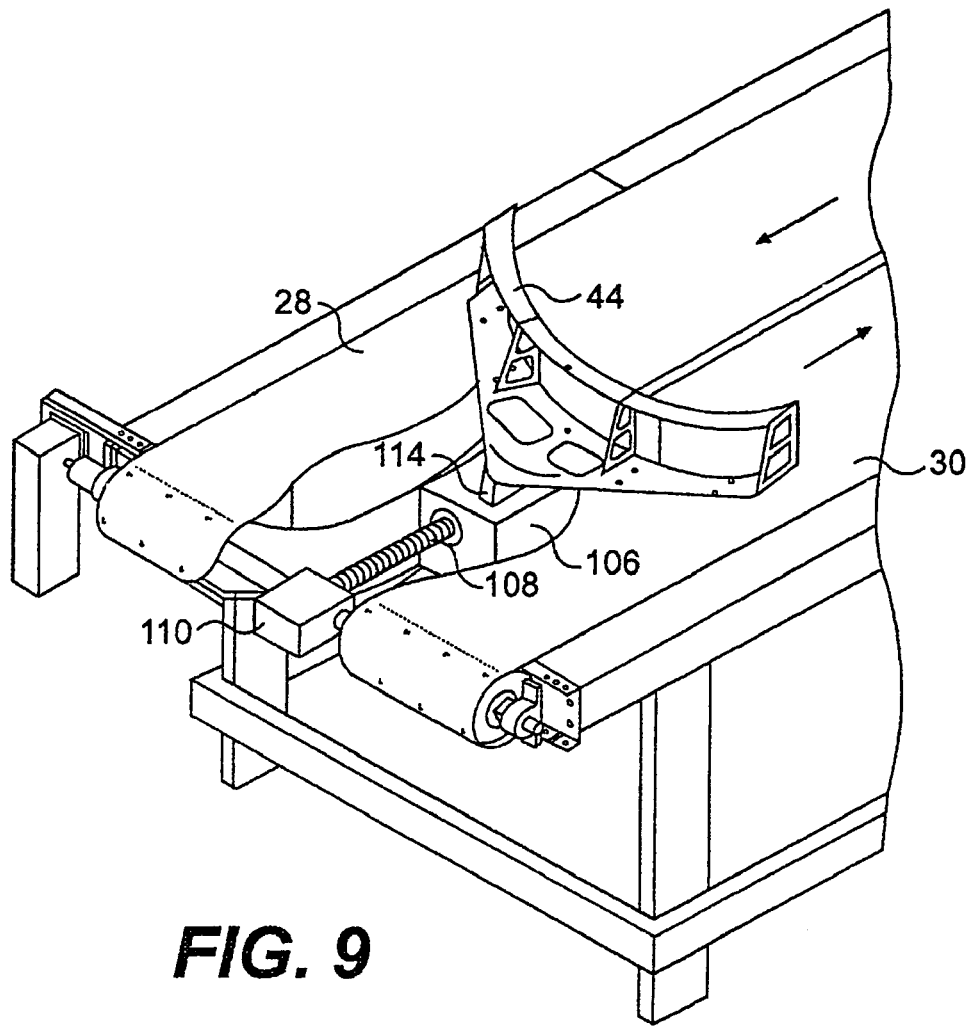
FIG. 9 is an isometric view of a portion of another version of article-diverting apparatus partly cut away to show a differential drive for a lead screw.
Figure 10:
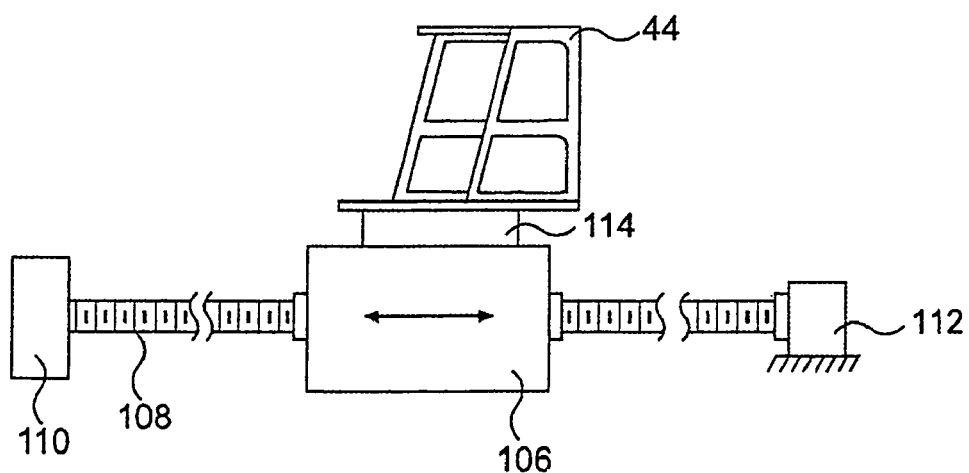
FIG. 10 is a side view of the lead screw drive of FIG. 9.

To this point, the carrier for the diverter element has been described as a belt (an intermediate belt or a carrier belt) differentially driven by a differential drive mechanism connected to infeed and outfeed belt drive mechanisms. In another version of the apparatus, shown in FIGS. 9 and 10, the diverter element 44 is carried on a carrier 106, which is the linearly variable nut of a lead screw 108. The lead screw is connected at one end to a stationary differential gear 110 and at the other to a fixed bearing block 112 at the opposite end of the carrier run. The speed and direction of rotation of the lead screw depend on the relative speeds of the infeed 28 and outfeed 30 belts. As the lead screw rotates, the carrier is driven linearly along its run. To minimize the space between the two conveyor belts, the diverter element is connected to the carrier by a thin, but sturdy, fin 114 that is attached to each by welding, for instance.

All of these diverter carrier arrangements can be used to divert articles from one conveyor to another and are useful, for example, in a first-in, first-out article accumulator, such as the one shown in FIG. 11. The accumulator system 116 effectively adjusts the length of a conveying path depending on the upstream supply of and the downstream demand for articles. A stream of articles 50 conveyed in the direction of arrow 118 by a main conveyor line 120 is received at an upstream location 122 of the main conveyor by an infeed conveyor belt 28 driven in the direction of arrow 34. An infeed guide rail 124 guides the stream of articles onto the infeed belt. As the infeed belt transports the articles, they are captured and redirected by the diverter element 44 attached to and carried by the intermediate belt 46. The articles transfer across the transfer surface 52 of the intermediate belt between the diverter element and the barrier 62 and onto the outfeed conveyor belt 30. The diverted articles are delivered to the main conveyor at a downstream location 128 by the outfeed conveyor belt driven toward the main conveyor. An outfeed guide rail 125 guides the stream of articles back onto the main conveyor. A transfer plate 126, such as a deadplate, is used for a smooth transfer of articles to and from the main conveyor. The main conveyor could alternatively use other transfer techniques, such as transfer belt edges attached to and moving with the main conveyor belt. The infeed and outfeed belts need not be perpendicular to the conveyor, but could, for example, run parallel to a main conveyor line that includes upstream and downstream segments on opposite sides of the infeed/outfeed belt unit. The accumulator allows the transport of articles along the main conveyor line to be adjusted for mismatches between the upstream supply of and the downstream demand for articles. The accumulator does this by controlling the effective length of the conveying path. As the supply of articles increases, the infeed belt is driven at a higher speed than the outfeed belt. The differentially driven carrier belt moves away from the main conveyor. With the diverter element farther away from the main conveyor, more articles can accumulate on the lengthened conveying path. As the demand for articles downstream increases to a level outstripping the supply of articles, the outfeed conveyor is driven faster than the infeed conveyor. When this occurs, the carrier belt and its diverter element move toward the main conveyor and shorten the effective conveying path and the proportional accumulation area. For protection, limit switches (not shown) at each end of the infeed/outfeed conveyor bed cause the motors to stop when the diverter element gets to either end of its permissible range along the conveyor bed.

The supply of and demand for articles can be sensed by conventional article sensors 130 positioned at, for example, upstream and downstream locations on the main conveyor. Their signals 132, 133 are electrically directed to a controller 134, which further sends control signals 136, 137 to the variable-speed drive motors 42 to adjust the speeds of the infeed and outfeed belts. Although the differential drive mechanisms described to this point are mechanically-coupled differentials, it would alternatively be possible to have an independent drive for the carrier with the differential speed calculated by the controller and an appropriate speed control signal sent to the carrier's differential drive mechanism. With such an arrangement, the controller easily tailors the speed relationship (e.g., $s=as_1-bs_2$) to the needs of the system at any time. An operator adjusts the values of the a and b parameters through the controller.

Thus, the invention has been described with respect to various versions by way of example. Even so, those skilled in the art will appreciate that other versions are possible without materially departing from the novel teachings and advantages of the invention. For example, the carrier could ride on a rack and pinion arrangement, cable and drum arrangement, or a drag chain and rail arrangement. As another example, multiple intermediate drive mechanisms, including multiple differentials, could be distributed along the conveyor, especially for long belts. The belts could be radius, sideflexing belts arranged along a curved path. The differential could be realized with spur gears or other gear types. As the examples suggest, these and other modifications are intended to be included within the scope of the invention as defined in the following claims.

What is claimed is:

1. Apparatus for diverting a stream of articles, comprising
a framework;
a first conveyor supported in the framework and conveying stream of articles along a first conveying surface;
a second conveyor supported in the framework parallel to the first conveyor and having a second conveying surface;
a first drive mechanism for driving the first conveyor at a first speed in a first direction;
a second drive mechanism for driving the second conveyor at a second speed in a second direction opposite to the first direction;
a carrier arranged to travel along a path parallel to the first and second conveyors;
a diverter element affixed to the carrier and extending across at least a portion of the conveying surfaces of the first and second conveyors to divert articles in the stream on the first conveyor to the second conveyor;

a carrier drive mechanism operatively configured to drive the carrier along the path at a speed and in a direction that depends on the first speed and the second speed the carrier drive mechanism disposed in a stationary position with reference to the framework; and a controller for calculating a differential speed corresponding to the difference in first and second speeds of the first and second conveyors respectively, and for controlling the carrier drive mechanism for driving the carrier at the differential speed.

2. The apparatus according to claim 1, wherein the carrier comprises a chain and rail arrangement.

3. The apparatus according to claim 1, further including article sensors positioned at upstream and downstream locations on a main conveyor for sensing the supply of and demand for articles.

4. The apparatus according to claim 1, wherein the controller receives electrical signals for controlling the carrier drive mechanism.

5. The apparatus according to claim 1, wherein the carrier drive mechanism drives the carrier at a speed proportional to $as_1-bs_2$, where $s_1$ is the speed of the first conveyor, $s_2$ is the speed of the second conveyor, and a and b are adjustable parameters.

6. The apparatus according to claim 1, wherein the controller controls the first drive mechanism and the second drive mechanism.

7. The apparatus according to claim 1, wherein the framework includes a conveyor bed having legs and a pair of parallel upper support rails.

8. The apparatus according to claim 7, wherein crossbeams span the support rails at opposite ends of the conveyor bed.

9. The apparatus according to claim 7, wherein each conveyor includes an endless loop member wrapped around rotating assemblies at the first and second ends of the conveyor bed.

10. The apparatus according to claim 9, wherein the drive mechanism for the first conveyor is located in the rotating assemblies stationed at the opposite end of the conveyor bed than the drive mechanism for the second conveyor.

11. The apparatus according to claim 1, wherein framework includes cross supports that support a conveyor pan or wearstrips that underlie the first conveyor and the second conveyor.

12. The apparatus according to claim 1, wherein the diverter element extends generally transverse to the first and second conveying surfaces and has a length so as to extend from the carrier at least partially across the first and second conveying surfaces to divert articles from one of the first and second conveying surfaces to the other respective conveying surface.

13. The apparatus according to claim 1, wherein the diverter element includes a first arcuate arm extending at least partway across the first conveying surface of the first conveyor and a second arcuate arm extending at least partway across the second conveying surface of the second conveyor.

14. The apparatus according to claim 1, wherein the first and second conveyors and the carrier comprise belts.

15. The apparatus according to claim 14, wherein the carrier is arranged parallel to and between the first and second conveyors.

16. The apparatus according to claim 15, wherein the conveying surfaces of the first and second conveyors and the transfer surface of the carrier are coplanar.

17. The apparatus according to claim 1, wherein the first and second conveyors run perpendicular to a main conveyor that includes upstream and downstream segments on opposite sides of the first and second conveyors.

18. The apparatus according to claim 1, wherein an infeed guide rail guides the stream of articles onto the first conveyor and an outfeed guide rail guides the stream of articles back onto the main conveyor.

* * * * *